United States Patent
Chen et al.

(10) Patent No.: US 12,180,034 B2
(45) Date of Patent: Dec. 31, 2024

(54) COMMUNICATION NETWORK SWITCHING SYSTEM AND METHOD FOR ELEVATOR SYSTEM, AND ELEVATOR SYSTEM

(71) Applicant: Otis Elevator Company, Farmington, CT (US)

(72) Inventors: Qiang Chen, Shanghai (CN); Shenhong Wang, Shanghai (CN); Bichun Li, Shanghai (CN); Yu Zhang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 531 days.

(21) Appl. No.: 17/529,585

(22) Filed: Nov. 18, 2021

(65) Prior Publication Data
US 2023/0002187 A1   Jan. 5, 2023

(30) Foreign Application Priority Data
Jun. 30, 2021   (CN) .......................... 202110734207.1

(51) Int. Cl.
*B66B 1/34* (2006.01)
*H04L 67/12* (2022.01)
*H04W 36/32* (2009.01)

(52) U.S. Cl.
CPC ............ *B66B 1/3461* (2013.01); *H04L 67/12* (2013.01); *H04W 36/322* (2023.05); *H04W 36/324* (2023.05)

(58) Field of Classification Search
CPC ....... H04L 67/12; H04W 36/32; B66B 1/3461
USPC ......................................................... 455/437
See application file for complete search history.

(56) References Cited

U.S. PATENT DOCUMENTS

| 2019/0168993 | A1* | 6/2019 | Kuenzi | .................. B66B 1/2458 |
| 2020/0087106 | A1  | 3/2020 | Kottur et al. | |
| 2020/0130991 | A1* | 4/2020 | Simcik | .................... B66B 3/006 |

FOREIGN PATENT DOCUMENTS

CN        110963379 A        4/2020

OTHER PUBLICATIONS

European Search Report for Application 21210060.6, Issued Apr. 26, 2022, 8 Pages.

* cited by examiner

*Primary Examiner* — Ted M Wang
(74) *Attorney, Agent, or Firm* — CANTOR COLBURN LLP

(57) ABSTRACT

A communication network switching system for an elevator system, a communication network switching method for an elevator system, and an elevator system are disclosed. The communication network switching system includes at least two communication networks, and the at least two communication networks are respectively arranged in different areas of the elevator system and a building where the elevator system is located, and are configured to provide a communication link for a movable device in the areas, in which the communication network switching system is configured to enable the communication link of the movable device to be switched from one of the at least two communication networks to the other of at least two communication networks according to current movement characteristics of the movable device.

19 Claims, 4 Drawing Sheets

COMMUNICATION NETWORK SWITCHING SYSTEM AND METHOD FOR ELEVATOR SYSTEM, AND ELEVATOR SYSTEM

This application claims priority to Chinese Patent Application No. 202110734207.1, filed Jun. 30, 2021, and all the benefits accruing therefrom under 35 U.S.C. § 119, the contents of which in its entirety are herein incorporated by reference.

TECHNICAL FIELD

The present disclosure relates to the technical field of network communication, and in particular to a communication network switching system for an elevator system, a communication network switching method for an elevator system, and an elevator system.

BACKGROUND ART

Various types of elevator equipment have been widely used in modern society, and they have brought great convenience to people's daily work and life. With the increasing progress of network, communication, electronics and the like, communication means used in an elevator environment have also undergone continuous development and improvement, but there are still some problems and deficiencies.

For example, people have increasingly put various devices such as robots into use in building services such as for object delivery and elevator-calling services, elevator-taking guidance or accompanying, safety inspections, and the like. Manufacturers generally configure software and hardware for them to implement functions such as wired or wireless communication. Therefore, such robots and other devices usually use a network in the elevator environment for information interaction. However, during the use of these existing devices, there may be adverse phenomena such as network communication delay, communication signal interruption, unstable working performance, etc., which are undesirable for the quality of such devices and elevator products, system safety and reliability, and user's comfort feeling and degree of satisfaction when taking the elevator, etc., and sometimes may even cause harm to equipment operation and personal safety.

The content in this section is to enable a clearer explanation and understanding of the present disclosure, and it should not be considered as already belonging to the prior art just because it is listed in this section.

SUMMARY

In view of the forgoing, the present disclosure provides a communication network switching system for an elevator system, a communication network switching method for an elevator system, and an elevator system, thereby solving or at least alleviating one or more of the above problems and other problems in the prior art.

Firstly, according to one aspect of the present disclosure, a communication network switching system for an elevator system is provided, which includes at least two communication networks, and the at least two communication networks are respectively arranged in different areas of the elevator system and a building where the elevator system is located, and are configured to provide a communication link for a movable device in the areas, in which the communication network switching system is configured to enable the communication link of the movable device to be switched from one of the at least two communication networks to the other of at least two communication networks according to current movement characteristics of the movable device.

In the communication network switching system for the elevator system according to the present disclosure, optionally, the communication network switching system includes: a first communication network, which is arranged in a fixed area in the building and/or the elevator system, so that when the movable device is in the fixed area, the communication link is provided via the first communication network; and a second communication network, which is arranged in a movable area in the elevator system, so that when the movable device is in the movable area, the communication link is provided via the second communication network.

In the communication network switching system for the elevator system according to the present disclosure, optionally, the communication network switching system further includes at least one third communication network, which is arranged in a part of the fixed area and/or a part of the movable area, so that the communication network switching system enables the communication link to be switched between any two of the first communication network, the second communication network and the third communication network according to the current movement characteristics of the movable device.

In the communication network switching system for the elevator system according to the present disclosure, optionally, the first communication network is arranged in at least a part of floor areas in the building, and the second communication network is arranged in at least a part of an elevator car area in the elevator system.

In the communication network switching system for the elevator system according to the present disclosure, optionally, the communication link is switchable between the first communication network and the second communication network after a door of the elevator car is opened.

In the communication network switching system for the elevator system according to the present disclosure, optionally, the movement characteristics include at least one of a spatial location, a movement speed and a movement direction of the movable device, spatial location data of the movable device is obtained by a first detection device arranged in the movable device, the elevator system and/or the building, and/or movement speed data and/or movement direction data of the movable device is obtained by a second detection device arranged in the movable device, the elevator system and/or the building.

In the communication network switching system for the elevator system according to the present disclosure, optionally, the spatial location data includes at least one of coordinate data and image data, in which the image data is configured to be compared with preset image data to determine the spatial location of the movable device, and the preset image data is associated with the area where the movable device is located and is stored in the elevator system, the movable device, a management system of the movable device and/or a cloud; and/or the first detection device includes a scanning device, which is arranged on the movable device for scanning information characteristics arranged in the elevator system and/or the building to obtain the spatial location data of the movable device, in which the information characteristics include a two-dimensional code, and the second detection device includes a displacement sensor, a gyroscope, and a lidar.

In the communication network switching system for the elevator system according to the present disclosure, optionally, the communication link is switchable from one of the at least two communication networks to the other of the at least two communication networks when the movement characteristic is larger than a first threshold and smaller than a second threshold.

In the communication network switching system for the elevator system according to the present disclosure, optionally, the movable device includes a robot and/or a detection terminal, and the communication link is a wireless communication link and/or a wired communication link.

Secondly, according to another aspect of the present disclosure, an elevator system is also provided, which includes the communication network switching system for the elevator system as described in any one of the above.

In addition, according to further another aspect of the present disclosure, a communication network switching method for an elevator system is further provided, which includes the steps of: based on at least two communication networks respectively arranged in different areas of the elevator system and a building where the elevator system is located, obtaining a communication link by a movable device in the areas; and enabling the communication link to be switched from one of the at least two communication networks to the other of at least two communication networks according to current movement characteristics of the movable device.

In the communication network switching method for the elevator system according to the present disclosure, optionally, a first communication network is arranged in a fixed area in the building and/or the elevator system, and a second communication network is arranged in a movable area in the elevator system, in which when the movable device is in the fixed area, the communication link is provided via the first communication network, and when the movable device is in the movable area, the communication link is provided via the second communication network.

In the communication network switching method for the elevator system according to the present disclosure, optionally, at least one third communication network is further arranged in a part of the fixed area and/or a part of the movable area, and the communication link is switchable between any two of the first communication network, the second communication network and the third communication network according to the current movement characteristics of the movable device.

In the communication network switching method for the elevator system according to the present disclosure, optionally, the first communication network is arranged in at least a part of floor areas in the building, and the second communication network is arranged in at least a part of an elevator car area in the elevator system.

In the communication network switching method for the elevator system according to the present disclosure, optionally, the communication link is switchable between the first communication network and the second communication network after a door of the elevator car is opened.

In the communication network switching method for the elevator system according to the present disclosure, optionally, the movement characteristics include at least one of a spatial location, a movement speed and a movement direction of the movable device, and the movement characteristics are obtained through at least one of the following ways: obtaining spatial location data of the movable device by using a first detection device arranged in the movable device, the elevator system and/or the building; and obtaining movement speed data and/or movement direction data of the movable device by using a second detection device arranged in the movable device, the elevator system and/or the building.

In the communication network switching method for the elevator system according to the present disclosure, optionally, the spatial location data includes at least one of coordinate data and image data, in which the image data is configured to be compared with preset image data to determine the spatial location of the movable device, and the preset image data is associated with the area where the movable device is located and is stored in the elevator system, the movable device, a management system of the movable device and/or a cloud; and/or the first detection device includes a scanning device, which is arranged on the movable device for scanning information characteristics arranged in the elevator system and/or the building to obtain the spatial location data of the movable device, in which the information characteristics include a two-dimensional code, and the second detection device includes a displacement sensor, a gyroscope, and a lidar.

In the communication network switching method for the elevator system according to the present disclosure, optionally, the communication link is switchable from one of the at least two communication networks to the other of the at least two communication networks when the movement characteristic is larger or smaller than a threshold.

In the communication network switching method for the elevator system according to the present disclosure, optionally, the movable device includes a robot and/or a detection terminal, and the communication link is a wireless communication link and/or a wired communication link.

By adopting the solution of the present disclosure, devices such as robots can be switched to a suitable communication network in time in two or more communication networks in the elevator system environment to establish a stable communication link, thereby overcoming problems such as network communication delay, communication signal interruption, unstable working performance existing in the prior art, which is not only advantageous for ensuring and improving the working performance of devices such as robots and the elevator, but also can improve the user's experience of taking the elevator, increase the degree of satisfaction, and optimize an overall service level of the elevator system.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION

First, it should be noted that the structure components, steps, features, advantages and the like of the communication network switching system for an elevator system, the communication network switching method for an elevator system and the elevator system according to the present disclosure will be described exemplarily below. However, neither of the descriptions should be taking as limiting the present disclosure in any way. For any single technical feature described or implied in the embodiments mentioned herein or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope recorded in this document.

In this document, technical terms "first", "second", and "third" are only used for the purpose of distinguishing expressions and are not intended to indicate their order and relative importance. The technical term "movable device" broadly refers to devices such as robots and detection terminals that can be used in an elevator system and can move in an active or passive manner (such as being carried by people). The technical term "robot" broadly refers to all machine devices that can perform tasks automatically, which may be used to replace or assist humans in many types of affairs, such as sending and receiving objects (such as documents, packages, food, etc.), guiding or accompanying users in taking the elevator, assisting users in calling the elevator, performing equipment inspections, and performing firefighting tasks, etc. The technical term "communication network" includes various forms of networks constructed using wireless method, wired method, or a combination of wireless and wired methods.

Referring to FIGS. 1 to 5, these drawings schematically illustrate specific scenes when several embodiments of the communication network switching system according to the present disclosure are used for communication network switching. Although a robot is used as an example, it should be understood that the present disclosure is also applicable to any possible movable device such as a space positioning terminal that can be carried and used by the staff during elevator system maintenance. Hereinafter, the present disclosure will be described in detail through the embodiments shown in FIGS. 1 to 5.

Figure 1:
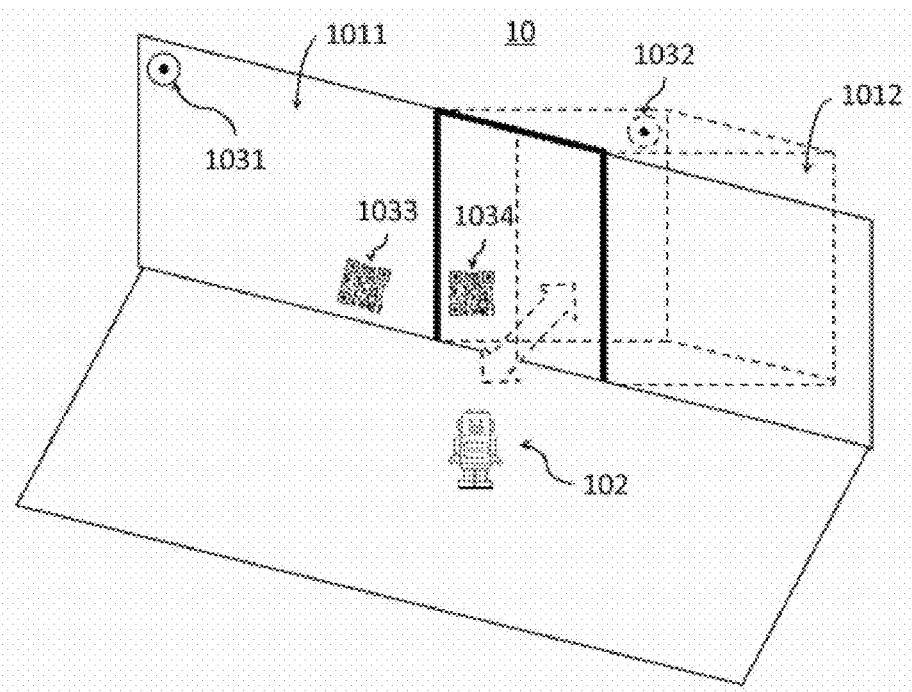
FIG. 1 is a schematic diagram of an application scene when communication network switching is performed in an embodiment of a communication network switching system according to the present disclosure.

First, a typical building application scene according to the solution of the present disclosure is shown in FIG. 1, in which a single-floor space 10 in the building where the elevator system is located is shown, and a floor area 1011 and an elevator car area 1012 passing through/parking in the floor area 1011 during the lifting/lowering movement are shown. A wireless communication network can be arranged through one or more transmitters 1031 located in the floor area 1011 so as to at least partially cover the floor area 1011, so that the wireless communication network can be used to provide a corresponding communication link for the device such as robot in the floor area 1011. In addition, another wireless communication network can be arranged through one or more transmitters 1032 located in the elevator car area 1012 so as to at least partially cover the elevator car area 1012, so that this wireless communication network can be used to provide a corresponding communication link for the device such as robot in the elevator car area 1012. It should be understood that the wireless signal coverages of the above two wireless communication networks may or may not have overlapping parts.

It should be pointed out that the present disclosure does not impose any restrictions on the communication protocol (such as WI-FI, ZIGBEE, etc.), operating frequency, and transmission power of the above two wireless communication networks respectively, as long as they can provide a physical link for the movable device such as the robot to communicate with the outside such as the elevator system, a robot management system, other robots, and a cloud.

Through the above arrangement, two different communication networks can exist in different areas of the building and the elevator system. For example, the above-mentioned floor area (a fixed area) and elevator car area (a movable area) are completely or partly covered by two wireless communication networks, thereby providing basic conditions for the device such as robot to choose a more suitable communication link therefrom. This is completely impossible in all existing elevator systems. The industry has long been accustomed to setting up a single communication network in these existing elevator systems, and making the single communication network cover most areas of the building and elevator system as much as possible. People in the industry has always been accustomed to providing stronger wireless signals and larger network coverage for the single communication network by increasing the transmission power of wireless devices or increasing the number of transmission devices. This will cause undesired situations such as communication signal interruption, network communication delay, unstable working performance, and battery power consumption to the device such as robot when such a communication network is always searching for the wireless network signal with the strongest signal strength.

According to the solution of the present disclosure, when the movable device such as a robot is working in the elevator system environment, its current movement characteristics (such as a spatial location, a movement speed, a movement direction, and any other characteristic related to the movement state) can be obtained. Then, a judgment is made based on the obtained current movement characteristics, so that the movable device such as the robot can be switched between the two wireless communication networks mentioned above when necessary, so as to select a more suitable communication link therefrom to communicate with the outside, thereby effectively alleviating or eliminating the problems of network communication delay, communication signal interruption and unstable working performance.

As an example, after the current spatial location of the movable device is obtained, it can be determined whether it is located in the fixed area (such as the floor area 1011) or the movable area (such as the elevator car area 1012) at this time, so that the wireless communication network corresponding to the area can be selected for the communication link. For example, once it is judged that the movable device has moved from the fixed area to the movable area according to the obtained current spatial location, it can be switched from the originally used communication network in the fixed area to the communication network in the current movable area, and vice versa. The above switching operation for the communication network may optionally be performed after a door of the elevator car is opened.

For another example, if it is found after detection that the movement speed of the movable device has changed, such as exceeding a first threshold (which may be set according to different applications; for example, it may be set to 5 m/s, 8 m/s, 10 m/s, etc.), it usually indicates in this case that the movable device has entered the elevator car area that is moving at a relatively high speed from the floor area that was originally moving at a relatively low speed, so that the movable device can be switched from the originally used communication network in the fixed area to the current communication network in the elevator car area. Similarly, if it is found that the movement speed of the movable device has decreased from a previous higher speed to be smaller than a second threshold (which may be set according to different applications; for example, it may be set to 6 m/s, 5 m/s, 2 m/s, etc.; the second threshold and the above-mentioned first threshold may be the same or different from each other), then it can indicate that the movable device has entered the floor area moving at a relatively low speed from the elevator car area that was originally moving at a relatively high speed. Therefore, the movable device can be switched from the originally used communication network in the movable area to the current communication network in the fixed area.

It can be understood that since the movement direction of the movable device moving in the fixed area such as the floor area 1011 may basically maintain a substantially horizontal direction, and when it enters the elevator car, it will follow the up-and-down lifting/lowering movement of the elevator car; at this time, its movement direction will be obviously different from the substantially horizontal movement direction when it was previously in the fixed area. For example, the two directions usually form an angle difference of about 90°. By detecting the movement direction of the movable device, it can be judged whether the movable device is currently in the fixed area or the movable area, or it has moved from the fixed area to the movable area, or it has moved from the movable area to the fixed area, etc. Therefore, the communication network corresponding to the newly entered area can be selected to complete the switching operation of the communication link.

It should be noted that in the present disclosure, many feasible ways are allowed to obtain the current movement characteristics of the movable device such as the robot, and different types of movement characteristics may be used alone or in combination to judge whether the movable device needs to the network switching operation.

For example, the spatial location data (such as coordinate data, image data, etc.) of the movable device can be obtained by one or more detection devices arranged in the movable device, the elevator system and/or the building. Such detection devices may include, but are not limited to, for example, height sensors and/or scanning devices installed on the movable device, wireless beacons installed in the building and/or the elevator system, and camera devices installed in the movable device, the building and/or the elevator system, etc. For another example, a movement detection device (such as a displacement sensor, a gyroscope, a lidar, etc.) may be used to obtain the movement speed data and/or movement direction data of the movable device. Such movement detection devices may be installed in the movable device, the elevator system and/or the building according to specific application requirements.

For example, as shown in FIG. 1, a robot 102 may be configured to detect its own current location in the space 10; for example, it can accurately determine its current location (such as reaching the centimeter level, etc.). If it is determined that it is currently in the elevator car area 1012, then it is connected to the wireless communication network constructed by the transmitter 1032; otherwise, if it is determined that it is currently in the floor area 1011, then it is connected to the wireless communication network constructed by the transmitter 1031. However, in some embodiments, the robot 102 may not need to accurately identify its current location; for example, it may only have to determine whether it is currently in the elevator car area 1012 or the floor area 1011. FIG. 1 shows a feasible solution in which there is no need to specifically identify the location of the robot 102, but to identify the area where it is located. An information characteristic 1034 (such as a two-dimensional code, etc.) configured to indicate the location may be posted in the elevator car area 1012, and an information characteristic 1033 (such as a two-dimensional code, etc.) configured to indicate the location may also be posted in the floor area 1011. If the robot 102 scans and identifies the information of the information characteristic 1033 through the scanning device installed on it, it can be judged that the robot 102 is in the floor area 1011; on the contrary, if the information of the information characteristic 1034 is identified, it can be judged that the robot 102 is in the elevator car area 1012. According to different applications, the information characteristic 1033 and the information characteristic 1034 configured to indicate the location information may be posted at any suitable location; for example, they may be arranged at a boundary between the elevator car area 1012 and the floor area 1011, so that the robot 102 can identify the conversion of the spatial area at the first time.

For another example, in some embodiments, image data associated with the area where the movable device is located may be pre-stored in the movable device, the elevator system, and/or the cloud, etc., such as images of at least a part of the floors in the building (such as floor number and other distinguishable signs, etc.), images of some devices or apparatuses in the elevator system, maps of an internal environment of the building, etc.; then one or more detection devices arranged in the movable device, the elevator system, and/or the building are used to obtain the image data of the current environment in which the movable device is located. By analyzing and judging the obtained image data and the pre-stored image data, the current location of the movable device can be determined; for example, it can be judged whether it is currently in the floor area of the building or in the elevator car area.

Figure 2:
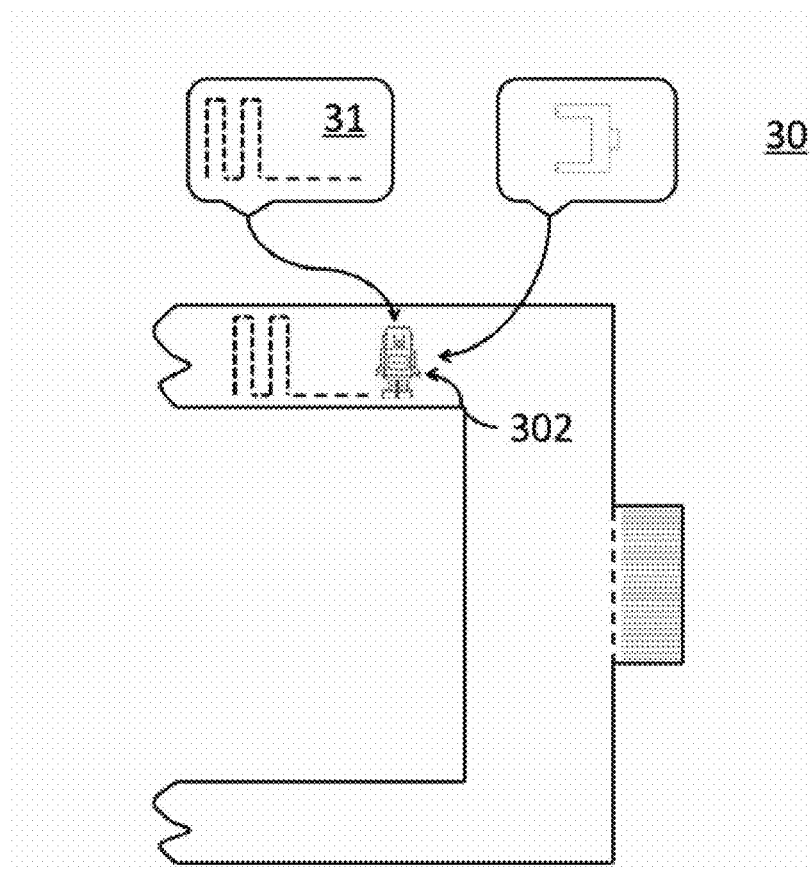
FIG. 2 is a schematic diagram of an application scene when communication network switching is performed in another embodiment of the communication network switching system according to the present disclosure.
Figure 3:
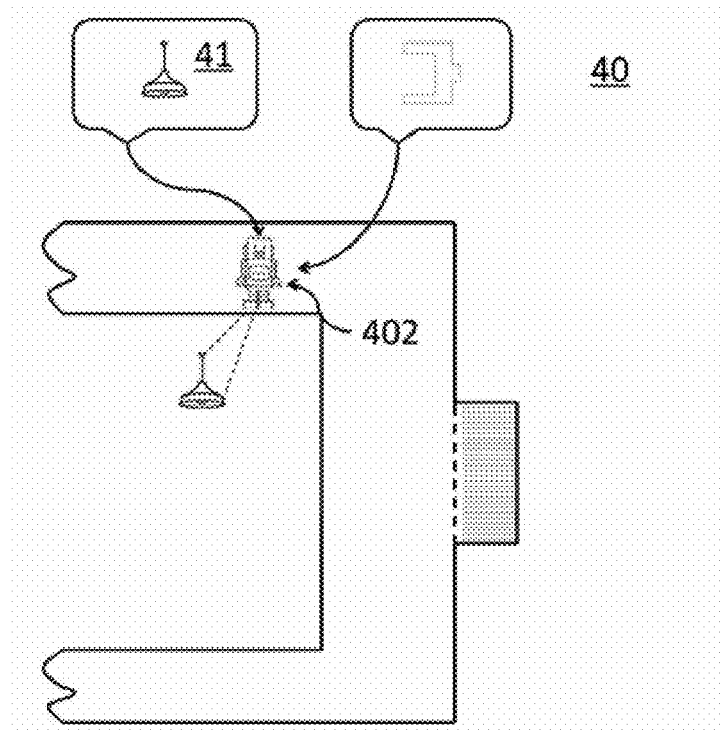
FIG. 3 is a schematic diagram of an application scene when communication network switching is performed in further another embodiment of the communication network switching system according to the present disclosure.
Figure 4:
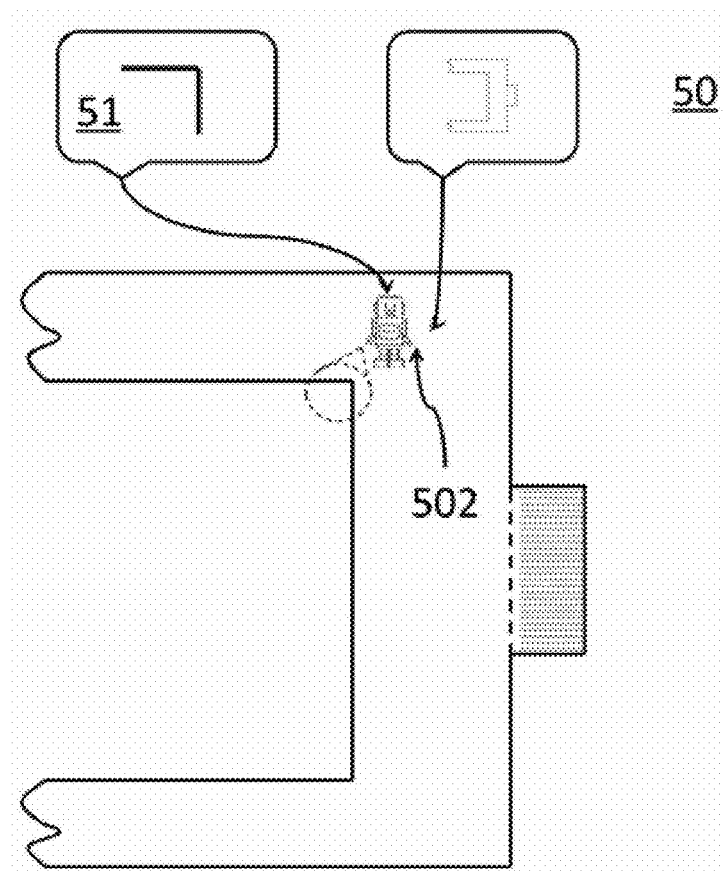
FIG. 4 is a schematic diagram of an application scene when communication network switching is performed in still further another embodiment of the communication network switching system according to the present disclosure.
Figure 5:
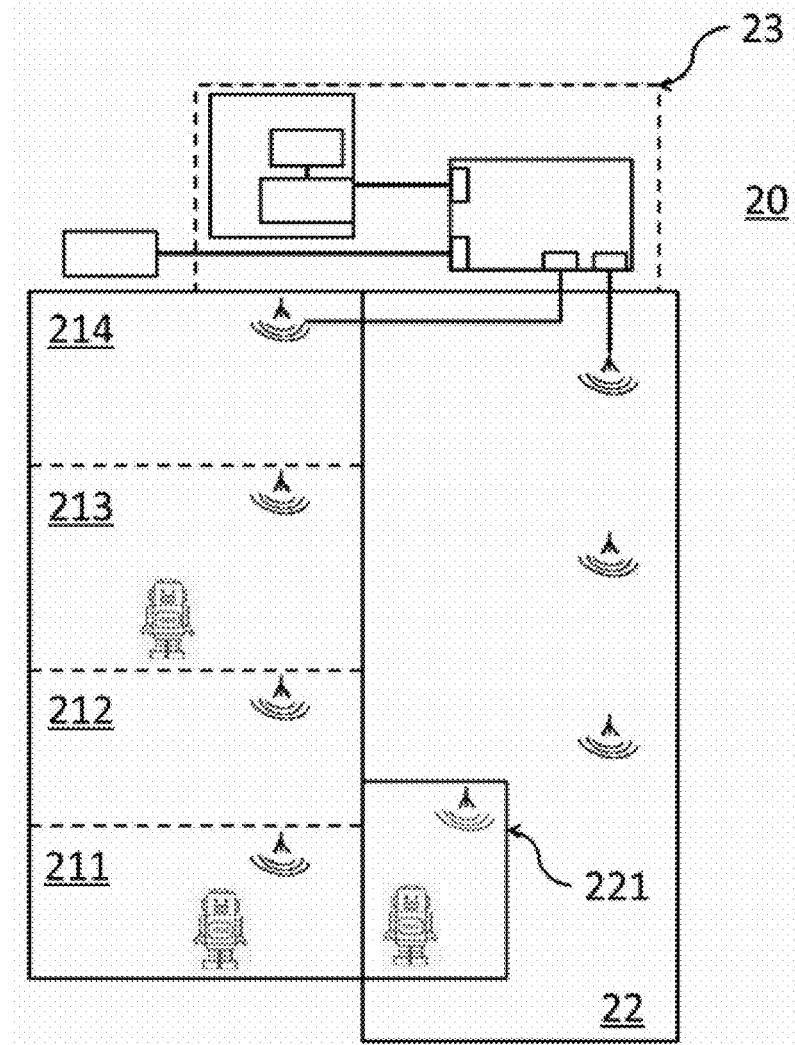
FIG. 5 is a schematic diagram of an application scene when communication network switching is performed in yet another embodiment of the communication network switching system according to the present disclosure.

With continued reference to FIGS. 2, 3 and 4, these drawings respectively show the determination of the current location of the robot based on several different spatial location data processing methods in an exemplary manner. As described above, spatial location data (such as image data, etc.) related to the building and/or the elevator system may be pre-stored in a storage part 30 (40, 50) on the robot 302 (402, 502), so that the robot 302 (402) 502) can determine its own location based on these pre-stored spatial location data and the spatial location data in the current environment that can be collected in real time. In some other embodiments, the robot 102 may also obtain pre-stored spatial location data related to at least a part of the space 10 from the elevator system, the cloud, etc., so as to determine the current location of the robot 102 in the space 10.

Specifically, in the example of FIG. 2, the robot 302 may obtain the spatial location data based on an inertial device (such as a gyroscope, a collision sensor, etc.), and then perform matching analysis processing with pre-stored map data to determine the location. For example, the robot 302 can use the aforementioned inertial device to measure in the space 30 to form a trajectory 31 as shown in FIG. 3; then, the trajectory 31 and the map data stored in the robot 302 are subjected to coordinate matching analysis processing to determine the current location of the robot 302.

In addition, in the examples of FIGS. 3 and 4, the robot 402 and the robot 502 can be respectively used to obtain image information (such as including distance information, etc.) in the space 40 and the space 50 based on a visual device (such as a camera, etc.) and a laser device (such as a lidar, etc.). FIGS. 3 and 4 schematically show characteristics 41 and 51 that can be extracted from the above image information respectively; then the above characteristics and the pre-stored map data are subjected to matching analysis processing so that the current locations of the robot 402 and the robot 502 can be determined.

In the above, a single floor in a building is used as an example, and the principles of some examples in the solutions of the present disclosure have been described in detail. It should be understood that the floor area of the building may include multiple floors, the first communication network may be arranged in some or all of the floors, and the second communication network may be correspondingly arranged in the elevator system at the same time. As an example, as shown in FIG. 2, a space 20 can be divided into floor areas 211-214, a hoistway 22, as well as an elevator car area 221 and a machine room 23 in the hoistway 22, and wireless communication networks are arranged in each of the floor areas 211-214. The wireless communication networks that can be emitted by multiple APs (Access Point, at least one AP may be set on each floor) belong to the same network for the movable device such as the robot, so the above networks can be used without changing any configuration. For example, the wireless communication networks in the floor areas 211-214 may have the same network identification, authentication information, etc., and these wireless communication networks and their possibly existing subordinate nodes may establish a connection with the machine room 23. When the movable device such as the robot is working under the same network constructed by multiple APs, which AP to connect can be specifically selected according to the strength of the wireless signal.

Similarly, several relay points can be optionally arranged as needed in the hoistway 22 for wireless relay, so as to better realize the connection of the wireless communication networks in the elevator car area 221 and the possibly existing subordinate nodes to the machine room 23. In specific applications, the above-mentioned first communication network and second communication network can be constructed to form a mesh network.

Figure 6:
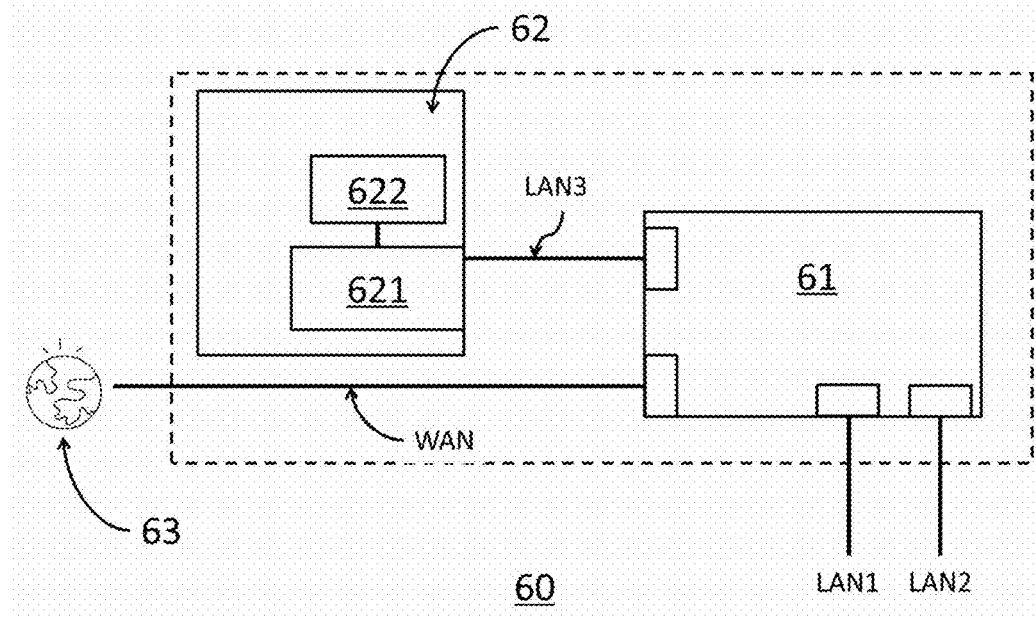
FIG. 6 is a schematic diagram of an elevator machine room in an embodiment of an elevator system according to the present disclosure.

With continued reference to FIG. 6, an example of an elevator machine room is schematically shown in this figure. As shown in the figure, a router 61, an elevator controller 62 and the like may be arranged in a machine room 60. LAN ports (LAN1-LAN3) of the router 61 can be respectively connected to the two communication networks described above and the elevator controller 62 (specifically connected to a connection circuit board 621). As an optional situation, a WAN port of the router 61 can be connected to an external network 63, so that the devices under the LAN ports have the Internet access function. The elevator controller 62 may include a connection circuit board 621, and a GECB control board (Global Elevator Control Board) 622. According to this configuration, the movable device such as the robot, for which a communication link is established via the first communication network or the second communication network, can communicate with the GECB control board 622 so as to perform functions such as elevator calling and equipment detection.

It should be noted that two wireless communication networks have been used as an exemplary description in the above. However, in actual applications, the above communication networks are all allowed to be a wired communication network. For example, a wired network interface may be arranged in the elevator car area to provide the communication link. Once the movable device such as the robot enters the elevator car, it can be inserted into such a wired network interface, so that it can be switched and connected to the communication network at this time for communication link. In addition, it should also be understood that the present disclosure allows one, two or more additional communication networks to be arranged in addition to the two communication networks. For example, they may be arranged in a part of the fixed area and/or a part of the movable area, so that the communication link of the movable device such as the robot can be switched between any two of the above multiple communication networks as needed, so as to select a more suitable and stable communication link to communicate with the outside. For the above communication networks, different network identifiers may be set.

Figure 7:
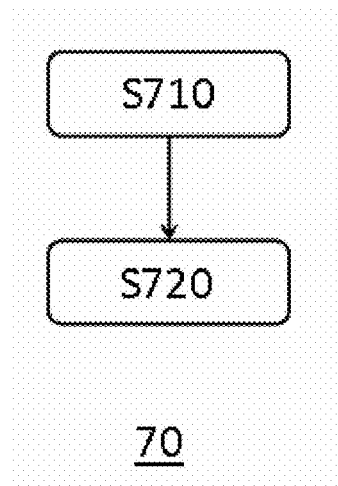
FIG. 7 is a schematic diagram of a processing flow of an embodiment of a communication network switching method according to the present disclosure.

Referring to FIG. 7 again, an example of a communication network switching method for an elevator system according to the present disclosure is roughly shown. As shown in FIG. 7, the communication network switching method 70 may include the following steps:

In step S710, through at least two communication networks respectively arranged in different areas of the elevator system and the building, the movable device such as the robot and the detection device in a certain area can use the communication network corresponding to this area to obtain a communication link to communicate with the outside such as the elevator system, the robot management system, other robots, and the cloud.

In step S720, the communication link of the movable device can be switched from the previously used communication network to the other one of the above at least two communication networks according to the current movement characteristics (for example, the spatial location, the movement speed, and the movement direction, etc.) of the above-mentioned movable device.

Since the technical contents such as arrangement and processing of the communication networks in the building and the elevator system, processing of the movement characteristics of the movable device, the switching processing between different communication networks and the movable device have been described in very great detail in the above, reference may be directly made to the specific description of the previous corresponding parts to implement more embodiments of the communication network switching method for the elevator system of the present disclosure (for example, after the door of the elevator car is opened, the communication link can be switched from the first communication network to the second communication network (corresponding to the situation of entering the elevator car), or switched from the second communication network to the first communication network (corresponding to the situation of leaving the elevator car)), and a repeated description will be omitted herein.

According to the technical solution of the present disclosure, an elevator system is also provided. Specifically, the elevator system can be equipped with the communication network switching system designed and provided according to the present disclosure, which can effectively alleviate or solve the problems that may exist in existing elevator systems, such as communication signal interruption, network communication delay and unstable working performance during the use of the movable device such as the robot and detection terminal, which helps improve the working performance of such movable devices, enhances the overall service level of the system, improves people's experience of taking the elevator, and realizes the above described technical advantages of the present disclosure that are obviously superior to the prior art.

The elevator brake performance detection method, the elevator brake performance detection device and the elevator brake according to the present disclosure have been elaborated above in detail by way of example only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed is:

1. A communication network switching system for an elevator system, comprising at least two communication networks, wherein the at least two communication networks are respectively arranged in different areas of the elevator system and a building where the elevator system is located, and are configured to provide a communication link for a movable device in the areas, and wherein the communication network switching system is configured to enable the communication link of the movable device to be switched from one of the at least two communication networks to the other of at least two communication networks according to current movement characteristics of the movable device;

wherein the movement characteristics comprise at least one a movement speed and a movement direction of the movable device, and movement speed data and/or movement direction data of the movable device is obtained by a first detection device arranged in the movable device, the elevator system and/or the building.

2. The communication network switching system for the elevator system according to claim 1, wherein the communication network switching system comprises:

a first communication network, which is arranged in a fixed area in the building and/or the elevator system, so that when the movable device is in the fixed area, the communication link is provided via the first communication network; and a second communication network, which is arranged in a movable area in the elevator system, so that when the movable device is in the movable area, the communication link is provided via the second communication network.

3. The communication network switching system for the elevator system according to claim 2, wherein the communication network switching system further comprises at least one third communication network, which is arranged in a part of the fixed area and/or a part of the movable area, so that the communication network switching system enables the communication link to be switched between any two of the first communication network, the second communication network and the third communication network according to the current movement characteristics of the movable device.

4. The communication network switching system for the elevator system according to claim 2, wherein the first communication network is arranged in at least a part of floor areas in the building, and the second communication network is arranged in at least a part of an elevator car area in the elevator system.

5. The communication network switching system for the elevator system according to claim 4, wherein the communication link is switchable between the first communication network and the second communication network after a door of the elevator car is opened.

6. The communication network switching system for the elevator system according to claim 1, wherein the movement characteristics comprises a spatial location, and wherein spatial location data of the movable device is obtained by a second detection device arranged in the movable device, the elevator system and/or the building.

7. The communication network switching system for the elevator system according to claim 1, wherein the communication link is switchable from one of the at least two communication networks to the other of the at least two communication networks when the movement characteristic is larger than a first threshold and smaller than a second threshold.

8. The communication network switching system for the elevator system according to claim 1, wherein the movable device comprises a robot and/or a detection terminal, and the communication link is a wireless communication link and/or a wired communication link.

9. An elevator system, comprising the communication network switching system for the elevator system according to claim 1.

10. A communication network switching system for an elevator system, comprising at least two communication networks, wherein the at least two communication networks are respectively arranged in different areas of the elevator system and a building where the elevator system is located, and are configured to provide a communication link for a movable device in the areas, and wherein the communication network switching system is configured to enable the communication link of the movable device to be switched from one of the at least two communication networks to the other of at least two communication networks according to current movement characteristics of the movable device;

wherein the movement characteristics comprise at least one of a spatial location, a movement speed and a movement direction of the movable device, and wherein spatial location data of the movable device is obtained by a first detection device arranged in the movable device, the elevator system and/or the building, and/or movement speed data and/or movement direction data of the movable device is obtained by a second detection device arranged in the movable device, the elevator system and/or the building;

wherein the spatial location data comprises at least one of coordinate data and image data, the image data is configured to be compared with preset image data to determine the spatial location of the movable device, and the preset image data is associated with the area where the movable device is located and is stored in the elevator system, the movable device, a management system of the movable device and/or a cloud; and/or the first detection device comprises a scanning device, which is arranged on the movable device for scanning information characteristics arranged in the elevator system and/or the building to obtain the spatial location data of the movable device, wherein the information characteristics comprise a two-dimensional code, and the second detection device comprises a displacement sensor, a gyroscope, and a lidar.

11. A communication network switching method for an elevator system, comprising:

based on at least two communication networks respectively arranged in different areas of the elevator system and a building where the elevator system is located, obtaining a communication link by a movable device in the areas; and enabling the communication link to be switched from one of the at least two communication networks to the other of at least two communication networks according to current movement characteristics of the movable device;

wherein the movement characteristics comprise at least one a movement speed and a movement direction of the movable device, and movement speed data and/or movement direction data of the movable device is obtained by a first detection device arranged in the movable device, the elevator system and/or the building.

12. The communication network switching method for the elevator system according to claim 11, wherein a first communication network is arranged in a fixed area in the building and/or the elevator system, and a second communication network is arranged in a movable area in the elevator system, and wherein when the movable device is in the fixed area, the communication link is provided via the first communication network, and when the movable device is in the movable area, the communication link is provided via the second communication network.

13. The communication network switching method for the elevator system according to claim 12, wherein at least one third communication network is further arranged in a part of the fixed area and/or a part of the movable area, and the communication link is switchable between any two of the first communication network, the second communication network and the third communication network according to the current movement characteristics of the movable device.

14. The communication network switching method for the elevator system according to claim 12, wherein the first communication network is arranged in at least a part of floor areas in the building, and the second communication network is arranged in at least a part of an elevator car area in the elevator system.

15. The communication network switching method for the elevator system according to claim 14, wherein the communication link is switchable between the first communication network and the second communication network after a door of the elevator car is opened.

16. The communication network switching method for the elevator system according to claim 11, wherein the movement characteristics comprises a spatial location obtained through obtaining spatial location data of the movable device by using a second detection device arranged in the movable device, the elevator system and/or the building.

17. The communication network switching method for the elevator system according to claim 11, wherein the communication link is switchable from one of the at least two communication networks to the other of the at least two communication networks when the movement characteristic is larger or smaller than a threshold.

18. The communication network switching method for the elevator system according to claim 11, wherein the movable device comprises a robot and/or a detection terminal, and the communication link is a wireless communication link and/or a wired communication link.

19. A communication network switching method for an elevator system, comprising:

based on at least two communication networks respectively arranged in different areas of the elevator system and a building where the elevator system is located, obtaining a communication link by a movable device in the areas; and enabling the communication link to be switched from one of the at least two communication networks to the other of at least two communication networks according to current movement characteristics of the movable device;

wherein the movement characteristics comprise at least one of a spatial location, a movement speed and a movement direction of the movable device, and the movement characteristics are obtained through at least one of the following ways:

obtaining spatial location data of the movable device by using a first detection device arranged in the movable device, the elevator system and/or the building; and obtaining movement speed data and/or movement direction data of the movable device by using a second detection device arranged in the movable device, the elevator system and/or the building;

wherein the spatial location data comprises at least one of coordinate data and image data, the image data is configured to be compared with preset image data to determine the spatial location of the movable device, and the preset image data is associated with the area where the movable device is located and is stored in the elevator system, the movable device, a management system of the movable device and/or a cloud; and/or the first detection device comprises a scanning device, which is arranged on the movable device for scanning information characteristics arranged in the elevator system and/or the building to obtain the spatial location data of the movable device, wherein the information characteristics comprise a two-dimensional code, and the second detection device comprises a displacement sensor, a gyroscope, and a lidar.

* * * * *